Aug. 8, 1967   R. C. BASSETT   3,335,217
THREE DIMENSIONAL DISPLAY SYSTEM
Filed Sept. 14, 1964
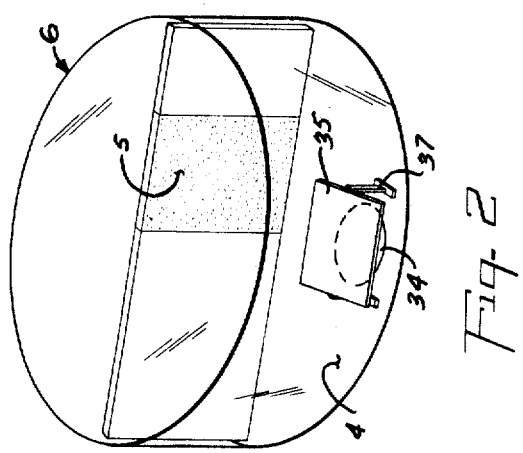
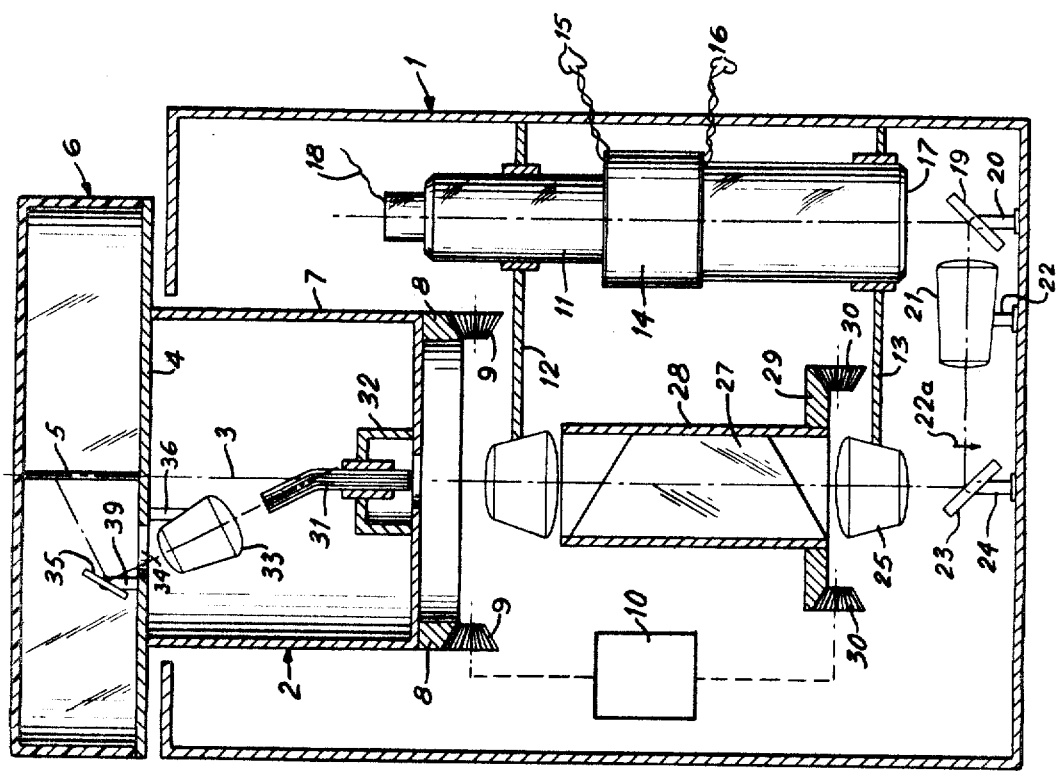
INVENTOR.
RAYMOND C. BASSETT
BY Philip M Bolton
ATTORNEY United States Patent Office 3,335,217
Patented Aug. 8, 1967

3,335,217
THREE DIMENSIONAL DISPLAY SYSTEM
Raymond C. Bassett, West Caldwell, N.J., assignor to International Telephone and Telegraph Corporation, Nutley, N.J., a corporation of Maryland
Filed Sept. 14, 1964, Ser. No. 396,263
11 Claims. (Cl. 178—6.5)

ABSTRACT OF THE DISCLOSURE

A three dimensional display system which utilizes means to prevent the image projected on a display screen from rotating in spite of the rotation of said screen with respect to the cathode ray tube that projects said image. The means whereby the image is prevented from rotation consists of a dove prism positioned in the path of the projected image with the longitudinal axis of the prism coinciding with the axis of the beam of light from the cathode ray tube, said prism rotating at half the rate of rotation of the display screen.

This invention relates to display apparatus for displaying information in three dimensions in space.

One of the objects of the present invention is to provide an apparatus for displaying information in three dimensions in space which is simpler to construct than those heretofore known and has fewer moving parts.

Another object of the invention is to provide an apparatus for displaying information in three dimensions which is more compact and lighter in weight than those heretofore known.

Another object of the invention is to provide means in a display apparatus using a translucent screen rotating about one edge thereof to form a concentric cylinder in which the image is continuously projected on the rotating screen from a stationary cathode ray tube, for compensating for the relative rotation between the screen of the cathode ray tube and the translucent screen.

Another object of the invention is to provide an apparatus for displaying information in three dimensions in which all the moving parts have a minimum size and weight, so that the power necessary to drive the apparatus is accordingly reduced.

Other objects and objects relating to the arrangements of the various parts of the apparatus will be apparent as the description of the invention proceeds.

One embodiment of the invention is shown in the accompanying drawings, in which:

FIGURE 1 is a schematic diagram of the apparatus showing the manner of projecting the information onto the rotating screen; and FIGURE 2 is a perspective view of the rotating carriage which supports the translucent screen.

In one type of apparatus, information was produced on the face or screen of a cathode ray tube in a well known manner by causing a small spot of light to be positioned in one coordinate by a first received signal and in the other coordinate by a second received signal. The face of the tube was then projected on the vertical, translucent screen, rotating about one vertical edge. If the spot of light were continuous, then a circle of light appeared to the observer as he viewed the rotating screen, the position of the circle axially of the concentric solid cylinder being determined by one of the received signals and the radius of the circle by the other received signal.

If then the spot of light on the cathode ray tube were caused by a third received signal to appear only when the translucent screen was at a particular angular position in its rotation, then only a point of light would appear in the concentric solid corresponding to the particular angular position of the screen at the time the third signal was received.

If the display is used as a radar screen, the angular position of the spot about the center would represent the azimuth of an object in space, while its axial position would represent its altitude and its distance from the axis of rotation the distance of the object from the radar transmitter.

In order to prevent rotation of the image on the screen caused by the rotation thereof, the cathode ray tube was caused to rotate wtih the screen which introduced many problems, especially in connection with the electrical connections to the cathode ray tube. The present invention permits the use of a stationary cathode ray tube with accompanying simpler wiring, and compensates for the relative rotation of the display screen and the face of the cathode ray tube by optical means.

Referring now more specifically to the drawings, the apparatus comprises a frame or housing 1 at the top of which a carriage 2 is mounted for rotation on a vertical axis, indicated at 3. The carriage comprises a circular platform 4 upon which is mounted a translucent screen 5 at right angles to the platform and with one edge of the screen coinciding with the axis of the carriage.

The screen is preferably made of a thin sheet of transparent material, such as glass or plastic, which has been finely sand blasted on both sides so as to make it translucent whereby a spot of light being projected against one side will be visible from either side. It is preferably made as part of a partition 6 that extends diametrically across the platform and which is painted a dead black, as is the platform and any other parts adjacent the screen.

When the platform is rotated at sufficient speed, the screen becomes imperceptible to the observer viewing it from a point above the platform 4, and assumes the form of a solid concentric but transparent cylinder.

A transparent cover 6 is provided for the screen which may have a flat top and cylindrical sides, so that the screen may be observed from any angle as it rotates.

The lower portion 7 of the carriage may extend into the housing 1 where it is suitably supported for rotation about the axis 3, as, for example, by the ring bevel gear 8 meshing wtih suitable supporting bevel gears 9, one of which is driven through a suitable mechanical connection, indicated by the dotted line, to a driving mechanism, indicated at 10.

The indication is produced by a projection type cathode ray tube 11 which is mounted, for example, in a vertical position in the housing 1 by means of brackets 12 and 13. This cathode ray tube is provided with a magnetic deflection yoke 14, adapted to receive the so-called horizontal and vertical deflecting signals over wires 15 and 16. These provide signals for two of the dimensions of the display and locate the spot of light on the face 17 of the tube, while the on and off condition of the spot may be controlled by signals over the wire 18, all in the normal manner of operating a cathode ray tube.

The image of the face 17 of the tube is projected onto the translucent screen in a manner now to be described. A first-surface mirror 19 is mounted by means of a support 20 at an angle beneath the tube 11, so as to direct light from the face 17 of the tube to a lens system 21 mounted with its axis horizontal on a support 22. The lens 21 is arranged to produce an aerial image, indicated at 22A, of the face 17 of the tube 11. A second first-surface mirror 23, mounted on a support 24 and positioned on the axis of the carriage 2, is set at the proper angle to direct light from the aerial image 22A towards the carriage 2 along its axis 3.

If the image from the cathode ray tube is projected directly upon the rotating screen 5, the image on the screen will rotate because of the relative rotation of the screen and tube. It is therefore necessary to provide some means to maintain the projected image against rotation. If a dove prism is positioned in the path of a projected image with the longitudinal axis of the prism coinciding with the axis of the beam of light and the prism is rotated on its longitudinal axis, then the projected image will make two complete rotations for each rotation of the prism. If the dove prism is rotated at half the rotation rate of a rotating image, then the image will be maintained stationary.

I make use of this principle in my display device for maintaining the image on the display screen against rotation. I provide two lenses 25 and 26, spaced apart from each other, and arranged to pick up the image from the mirror 23 and project it towards the carriage 2 on the axis thereof. Between these two lenses I position a dove prism 27 in a suitable carrier 28 mounted for rotation about the longitudinal axis, as, for example, by means of a ring bevel gear 29 meshing with supporting bevel gears 30, one of which is driven at half the speed of the carriage 2 by suitable mechanical connection to the driving mechanism 10, as indicated by the dotted line.

In order to steer the projected beam from the axis of the rotating carriage where it enters the carriage to the face of the display screen, I provide the following optical system: A fiber optic image conduit 31 is supported in the carriage 2 by a suitable bracket 32. The lower end of this conduit is coaxial with the carriage and receives the projected beam from the lens 26. The upper end of the conduit is bent outwardly to project the light at an angle of about forty-five degrees from the axis. The beam then passes through a lens 33 and through an opening 34 in the platform 4 and is redirected by a first-surface mirror 35 towards the display screen 5. The lens 33 may be supported from the platform 4 by a suitable bracket 36 and the mirror 35 by a suitable bracket 37. The lens 33 is arranged to produce the constricted cross-over point of the beam at the place where the first-surface mirror 35 redirects the beam towards the display screen. Thus the mirror 35 may be of minimum size for carrying out its function, so as not to interfere with the observation of the screen.

While I have shown a dove prism 27, it is entirely possible to obtain the effect of a dove prism by means of a system of first-surface mirrors arranged to perform the same function as the surfaces of the prism. Therefore, the term "dove prism" in the claims includes any such arrangement of mirrors.

It will be noted that the only rotating parts of the display apparatus are the display screen 5, the mirror 35, the lens 33, fiber conduit 31, and the dove prism 27. These are small enough to be easily counterbalanced in their respective carriages 2 and 29, so that the carriages can be dynamically balanced to permit substantially vibration-free rotation.

The size of the display is, of course, optional, but I have found by experiment that a display volume seven inches in diameter and three inches high gave excellent results if the resolution is two lines or better per millimeter. In such a case, the display volume would be viewed from a distance of ten or fifteen inches.

It is preferable to enclose the entire projection path from the cathode ray tube to the fiber conduit 31 in a light-tight housing (not shown) with all the walls and supporting parts painted a dead black to prevent any unwanted reflections of extraneous light.

The three-dimensional display has three distinct advantages over a flat display: (1) binocular disparity is produced by the differential images focused on the retinas of each eye caused by interocular separation; (2) better depth of field is produced in which objects are in sharp focus for any accommodation or distance of focus of the eye; (3) motion paralax is improved since there is relative movement of objects with respect to each other when the viewer's reference position changes.

Each of these effects is found to peak as the near point of vision is approached; hence the desirability of viewing from a distance of ten or fifteen inches.

The invention is useful for examining any three dimensional data or phenomena, and also as an auxiliary display in systems handling three-dimensional situations with more conventional two-dimensional displays.

The mirrors 19 and 23 are used for the purpose of bending the path of the projection to make the whole apparatus more compact. The cathode ray tube may be positioned, if desired, on the axis of the carrier 2, in which case the mirrors 19 and 23 would be eliminated. Also, it will be evident that the projection path may be folded or bent in other ways by the proper positioning of mirrors, and the optical system may be changed, as desired, as long as the image on the cathode ray tube is continuously projected onto the display screen through an effective dove prism which should be rotated at half the speed of the display screen.

Many other modifications may be resorted to without departing from the spirit of the invention, and I do not therefore desire to limit my invention except by the limitations of the appended claims.

I claim:

1. An apparatus for displaying information in three dimensions in solid space comprising:
    (a) a rotatable translucent display screen;
    (b) means for rotating said display screen at a predetermined rate about an axis lying in the plane thereof;
    (c) a stationary coordinate screen;
    (d) means for producing an indication on said coordinate screen;
    (e) means for positioning said indication on said stationary screen in one coordinate in accordance with a first received signal;
    (f) means for positioning said indication on said stationary screen in the other coordinate in accordance with a second received signal;
    (g) an optical system for continuously projecting the image of said coordinate screen on one side of said display screen;
    (h) means in said optical system for maintaining the projected image of said coordinate screen against rotation on said display screen as said display screen rotates; and
    (i) means for causing said indication to appear on said coordinate screen at times responsive to a third received signal.

2. An apparatus for displaying information in three dimensions in space, as defined in claim 1, in which the means in said optical system for maintaining the projected image of said coordinate screen against rotation on said display screen comprises:
    (a) a dove prism with its longitudinal axis in the projection path between said coordinate screen and said display screen; and
    (b) means for rotating said prism at half the rate of rotation of said display screen and in the same direction thereof with respect to the direction of the projection.

3. An apparatus for displaying information in three dimensions in space, as defined in claim 2, in which the optical system comprises:
    (a) first optical means for producing an aerial image of the coordinate screen;
    (b) second and third optical means for projecting said aerial image, the dove prism being between said second and third optical means with its longitudinal axis coinciding with the axis of said second and third optical means;
    (c) means for guiding the projected beam towards said display screen on the axis of rotation thereof; and (d) means mounted for rotation with said display screen for intercepting the projected beam on the axis of rotation and directing it against said display surface.

4. An apparatus for displaying information in three dimensions in space, as defined in claim 3, in which the means mounted for rotation with the display screen for intercepting and directing the projected beam against the display surface comprises:
 (a) a fiber optic image conduit with one end on the axis of rotation of said display screen and the other end directed away from said axis; and
 (b) a first-surface mirror for intercepting and redirecting the beam projected from said conduit towards said display screen.

5. An apparatus for displaying information in three dimensions, as defined in claim 4, in which the means for intercepting and directing the projected beam against the display screen further comprises a lens in the path of the projected beam for focusing the image of the coordinate screen upon the display screen.

6. An apparatus for displaying information in three dimensions in space, as defined in claim 5, in which the second and third optical means and the dove prism are coaxial with the end of the fiber optic image conduit and the axis of rotation of said display screen.

7. An apparatus for displaying information in three dimensions, as defined in claim 5, in which the first-surface mirror for directing the projected beam against the display screen is positioned at the constricted cross-over point of the beam between the focusing lens and the display screen.

8. An apparatus for displaying information, as defined in claim 1, in which the axis of rotation of the display screen is along one edge thereof.

9. An apparatus for displaying information, as defined in claim 1, in which the means for rotating the display screen comprises a carriage mounted for rotation, said display screen being mounted on said carriage, and in which the optical system for continuously projecting the image of the coordinate screen on the display screen comprises:
 (a) a fiber optic image conduit mounted on said carriage with one end aligned with the axis thereof and the other end turned away from said axis;
 (b) a first-surface mirror mounted on said carriage in the path of projection from said other end of said conduit and adapted to redirect the projected beam towards said display surface; and
 (c) a lens mounted on said carriage between said conduit and said mirror for focusing the image of the coordinate screen upon the display screen, said mirror being positioned at the constricted cross-over point of the projected beam between said lens and said display screen.

10. An apparatus for displaying information, as defined in claim 1, in which the optical system comprises:
 (a) first optical means for producing an aerial image of the coordinate screen;
 (b) second and third optical means for projecting said aerial image, the axis of said second and third optical means being aligned with the axis of rotation of the display screen; and in which the means in said optical system for maintaining the projected image against rotation comprises:
 (1) a dove prism between said second and third optical means with its longitudinal axis aligned with the axis of said optical means; and
 (2) means for rotating said effective dove prism at half the rotation rate of said display screen.

11. An apparatus for displaying information in three dimensions in space comprising:
 (a) a frame;
 (b) a carriage mounted on said frame for rotation about an axis;
 (c) means for rotating said carriage at a predetermined rate;
 (d) a thin sheet of translucent material mounted on said carriage with one edge thereof on the axis of rotation of said carriage;
 (e) a cathode ray tube mounted in fixed position on said frame, spaced from the axis of said carriage with its screen axially displaced from said sheet of translucent material;
 (f) a first first-surface mirror mounted on said frame and positioned at such an angle with respect to the screen of the cathode ray tube as to direct light therefrom towards the axis of rotation of said carriage;
 (g) first optical means mounted on said frame in the path of light from said first first-surface mirror for producing an aerial image;
 (h) a second first-surface mirror mounted on said frame in such a position as to reflect said aerial image along the axis of said carriage towards said display screen;
 (i) second and third optical means mounted on said frame, spaced apart between said second first-surface mirror and said carriage for projecting said aerial image towards said carriage;
 (j) a dove prism between said second and third optical means with its longitudinal axis coaxial therewith;
 (k) means for rotating said dove prism at half the rate of rotation of said carriage and in the same direction;
 (l) a fiber optic image conduit mounted on said carriage, having one end on the axis thereof facing said third optical means for intercepting and conducting the projected beam from said third optical means, the other end of said conduit being directed away from said carriage axis and from the plane of said sheet of translucent material;
 (m) a third first-surface mirror mounted on said carriage in such a position as to redirect the projected beam emerging from said conduit towards said translucent sheet; and
 (n) fourth optical means mounted on said carriage between said conduit and said third mirror for focusing said aerial image on said translucent sheet, said mirror being at the point of constricted cross-over of the projected beam.

References Cited

UNITED STATES PATENTS

| | | | |
|---|---|---|---|
| 2,603,777 | 7/1952 | Ranger | 343—7.9 |
| 2,625,679 | 1/1953 | Iams | 343—7.9 |
| 2,967,905 | 1/1961 | Hirsch | 178—6.5 |
| 3,140,415 | 7/1964 | Ketchpel | 178—6.5 |
| 3,202,985 | 8/1965 | Perkins | 343—7.9 |

JOHN W. CALDWELL, *Acting Primary Examiner.*

J. A. ORSINO, *Assistant Examiner.*